United States Patent
Inoguchi

(10) Patent No.: US 8,434,114 B2
(45) Date of Patent: Apr. 30, 2013

(54) ELECTRONIC DEVICE, DISPLAY SYSTEM, DISPLAY METHOD, AND PROGRAM

(75) Inventor: Yohei Inoguchi, Tokyo (JP)

(73) Assignee: Access Co., Ltd., Tokyo (JP)

( * ) Notice: Subject to any disclaimer, the term of this patent is extended or adjusted under 35 U.S.C. 154(b) by 1099 days.

(21) Appl. No.: 12/309,792

(22) PCT Filed: Jul. 31, 2007

(86) PCT No.: PCT/JP2007/064941
§ 371 (c)(1),
(2), (4) Date: Jan. 30, 2009

(87) PCT Pub. No.: WO2008/016031
PCT Pub. Date: Feb. 7, 2008

(65) Prior Publication Data
US 2009/0320070 A1    Dec. 24, 2009

(30) Foreign Application Priority Data
Jul. 31, 2006    (JP) ................................ 2006-209219

(51) Int. Cl.
*G06F 13/00* (2006.01)

(52) U.S. Cl.
USPC ............... 725/60; 725/40; 345/173; 455/566; 455/575

(58) Field of Classification Search ........................ None
See application file for complete search history.

(56) References Cited

U.S. PATENT DOCUMENTS

| | | | | |
|---|---|---|---|---|
| 6,061,056 A | * | 5/2000 | Menard et al. ................. | 715/704 |
| 2002/0097984 A1 | * | 7/2002 | Abecassis ....................... | 386/70 |
| 2003/0119562 A1 | * | 6/2003 | Kokubo .......................... | 455/566 |

(Continued)

FOREIGN PATENT DOCUMENTS

| | | |
|---|---|---|
| EP | 1765008 A1 | 3/2007 |
| JP | 11-243512 A | 9/1999 |

(Continued)

OTHER PUBLICATIONS

Office Action received for Chinese Patent Application No. 200780028129.1, issued on Nov. 9, 2010, 16 pages (11 pages of English Translation and 5 pages of Office Action).

(Continued)

*Primary Examiner* — Cai Chen
(74) *Attorney, Agent, or Firm* — Morrison & Foerster LLP

(57) ABSTRACT

An electronic device comprising: a content acquiring means capable of acquiring content acquired via a network or from inside of the electronic device, or generated inside of the electronic device; a first displaying means capable of displaying the acquired first content; a second displaying means arranged as a touch panel which is capable of accepting an input operation of a user, and capable of displaying the acquired second content; a display controlling means which, based on a predetermined condition, when the content acquiring means acquired third content in a state where the first and second content are displayed in the first and second displaying means, respectively, performs one of: (1) displaying in the second displaying means the third content clearing the second content, (2) presenting a split view by splitting the screen of the first display means into parts for the first and second content, and displaying in the second displaying means the third content, and (3) presenting a split view by splitting the screen of the second displaying means into parts for the second and third content.

22 Claims, 7 Drawing Sheets

U.S. PATENT DOCUMENTS

| | | | |
|---|---|---|---|
| 2004/0208372 A1 | 10/2004 | Boncyk et al. | |
| 2005/0208962 A1* | 9/2005 | Kim | 455/550.1 |
| 2007/0083906 A1* | 4/2007 | Welingkar | 725/110 |
| 2007/0285401 A1* | 12/2007 | Ohki et al. | 345/173 |

FOREIGN PATENT DOCUMENTS

| | | |
|---|---|---|
| JP | 2000-324416 A | 11/2000 |
| JP | 2003-333362 A | 11/2003 |
| JP | 2005-136518 A | 5/2005 |
| WO | WO-03/077553 A1 | 9/2003 |
| WO | WO-2005/120052 A1 | 12/2005 |
| WO | WO-2006/051669 A1 | 5/2006 |

OTHER PUBLICATIONS

International Search Report mailed Nov. 13, 2007, for PCT Application No. PCT/JP2007/064941 filed Jul. 31, 2007, 4 pages.

Nikkei BP (Oct. 5, 2005). "[CEATEC] DoCoMo, and Mitsubishi Electric Manufactures for Trial of a Mobile Phone in which the Button Unit is a Touch Panel," *IT Pro, Domestic News*, located at <http://itpro.nikkeibp.co.jp/article/NEWS/20051005/222279/>. (1 page).

Office Action received for Chinese Patent Application No. 200780028129.1, mailed on Mar. 19, 2012, 19 pages (13 pages of English Translation and 6 pages of Office Action).

Office Action received for Japanese Patent Application No. 2008-527752, mailed on Sep. 3, 2012, 7 pages (3 pages of English Translation and 4 pages of Office Action).

Office Action received for Chinese Patent Application No. 200780028129.1, issued on Nov. 5, 2012, 8 pages (5 pages of English Translation and 3 pages of Office Action).

\* cited by examiner

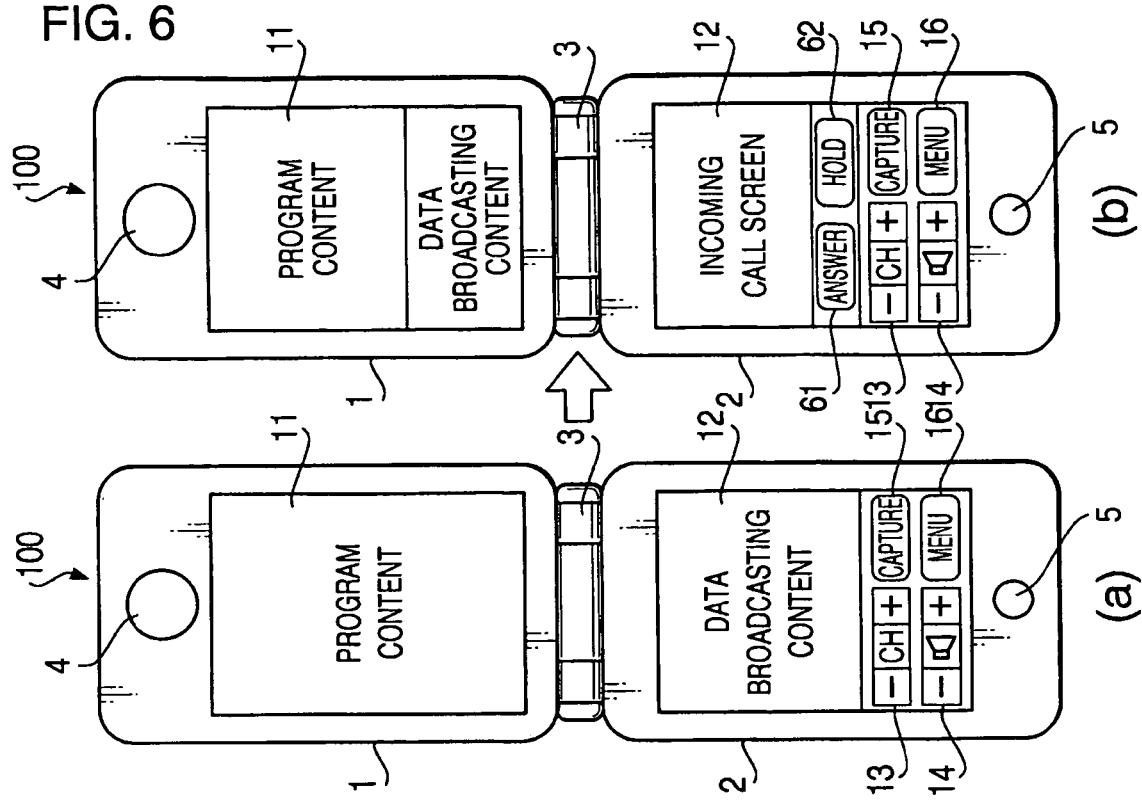
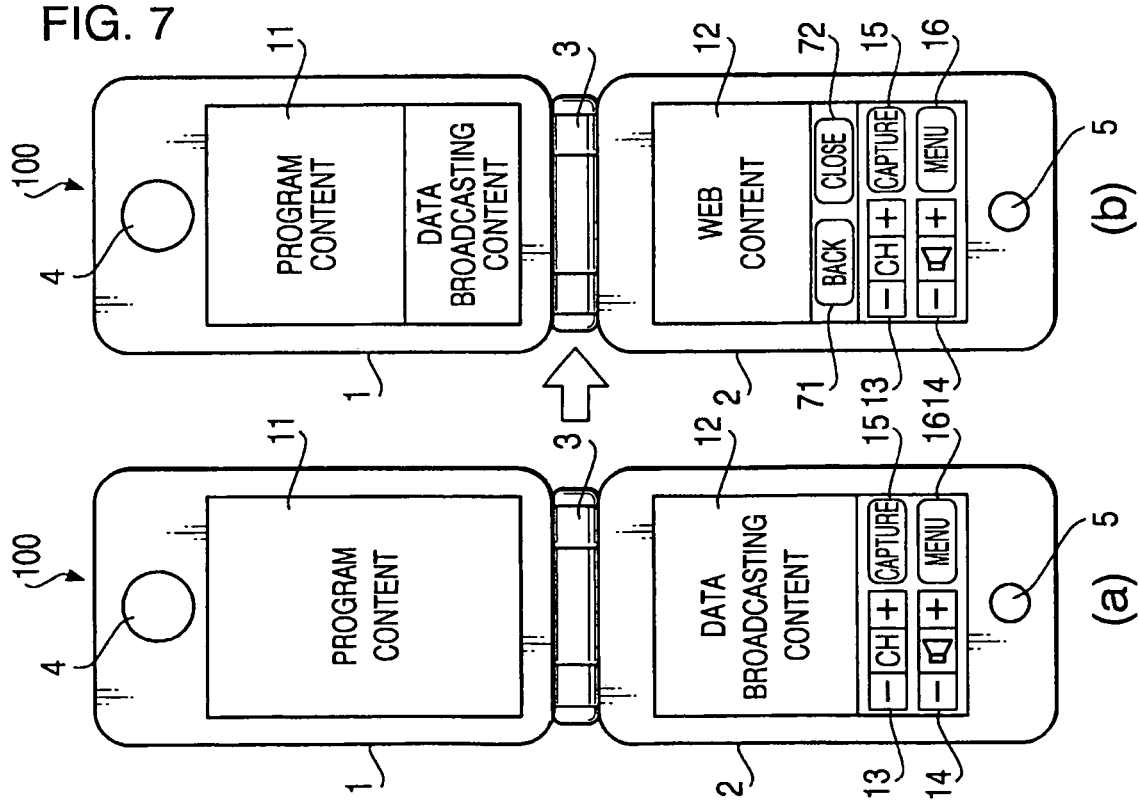

ELECTRONIC DEVICE, DISPLAY SYSTEM, DISPLAY METHOD, AND PROGRAM

FIELD OF THE INVENTION

The present invention relates to an electronic appliance, a displaying system, a displaying method, and a program which are capable of receiving broadcasting, such as a terrestrial digital broadcasting.

BACKGROUND OF THE ART

Currently, terrestrial digital broadcasting services for mobile appliances, such as mobile phones, that use a part of frequency band for terrestrial digital broadcasting (so called "one-seg" broadcasting) had been started. In the "one-seg" broadcasting, content of the television program broadcasting and the content of data broadcasting using BML (Broadcast Markup Language) as a description language and closed-captioned broadcasting are multiplexed and broadcasted, and in the mobile appliance side, it becomes possible to display simultaneously the data for both broadcasting in one displaying screen by dividing it.

While watching the above described "one-seg" broadcasting, when there occurs a need to display "other content" other than the content of television broadcasting programs and the content of data broadcasting due to the process of, for example, some operation by the user, receiving a phone call, or receiving an electronic mail, it becomes necessary to suspend display for either of the content of the television broadcasting program or the content for the data broadcasting being displayed. Therefore, the user may miss either of the content, and it becomes inconvenient for the user desiring to watch simultaneously both content with the above described "other content".

In relation to the art for displaying the content of the television program broadcasting and the content of the data broadcasting, Japanese Patent Provisional Publication No. JP H11-243512A (paragraph [0024]-[0026], FIG. 1, etc.) discloses an art for displaying a motion picture of television program broadcasting in the screen displaying unit of a television set as a parent machine, and displaying text information, such as caption information (telop) as a part of the motion picture, in a small displaying equipment as a child machine.

Also, in Japanese Patent Provisional Publication No. JP2000-324416A (paragraph [0021], FIG. 1, FIG. 7-9, etc.), an art that displays image information of a television broadcasting in the main apparatus (television), extracts data, such as texts in text broadcasting or data broadcasting and still images, from the television broadcasting which the main apparatus received, and transfers it to the terminal for displaying still images to display on the liquid crystal display of the terminal for displaying still images is disclosed. In this art, the liquid crystal display of the terminal for displaying still images functions as a touch panel, as well as a web browser, and it becomes possible to utilize various services in the web via the main apparatus.

Further, a non patent document (NikkeiBP, IT Pro, domestic news "[CEATEC] DoCoMo, and Mitsubishi Electric manufactures for trial of a mobile phone in which the button unit is a touch panel.", [online] Oct. 5, 2005, Internet URL: http://itpro.nikkeibp.co.jp/article/NEWS/20051005/222279/) discloses two screens mobile phone in which the operation input unit is a touch panel removing mechanical keyboard used in conventional mobile phones as an operation input unit. In such a two screens mobile phone, when displaying the above "one-seg" broadcasting, there may be a case where television program broadcast content is displayed in one of the displaying screen and keys for operation input and data broadcast content are displayed in another displaying screen.

DISCLOSURE OF THE INVENTION

However, neither of the above documents discloses a countermeasure against a case where a need to display "other content" occurs when the television program broadcast content and the data broadcast content are displayed in the two screens are respectively. Therefore, in the art described in each of the documents, when one of the two screens is used for displaying "other content", either of the television program broadcast content and the data broadcast content is forced to cease displaying.

In view of the above circumstances, an object of the present invention is to provide an electronic appliance, a displaying system, a displaying method and a program which are capable of displaying "other content" while continuing to display both the television program broadcast content and the data broadcast content.

In order to resolve the above described problems, an electronic device according to a main aspect of the invention, comprises: a content acquiring means capable of acquiring content via a network or from inside of the electronic device, or generated inside of the electronic device; a first displaying means capable of displaying the acquired first content; a second displaying means arranged as a touch panel which is capable of accepting an input operation of a user, and capable of displaying the acquired second content; and a display controlling means which, based on a predetermined condition, when the content acquiring means acquires third content in a state where the first and second content are displayed in the first and second displaying means, respectively, performs one of: (1) displaying in the second displaying means the third content while clearing the second content, (2) presenting a split view by splitting a screen of the first display means into parts for the first and second content, and displaying the third content in the second displaying means, and (3) presenting a split view by splitting a screen of the second displaying means into parts for the second and third content.

According to such an arrangement, upon acquiring the third content, based on certain condition, the display controlling means is able to present a split view, for example, in the second displaying means, by splitting the screen of the second display means into parts for the first content which is displayed in the first displaying means and the second content which is displayed in the second displaying means, without clearing the display of the first and second content, and also, for example, display the third content in the second display, or display the first content in the first displaying means and present a split view for the second and the third content in the second displaying means. When such a display control is performed, the user is able to browse the third content and at the same time, continue to browse the first and the second content, and thereby, the user does not miss desired content.

The electronic device is a portable type electronic device such as a mobile phone, a game machine, and a PDA (Personal Digital Assistant). The network includes various communications network including a broadcasting network such as digital TV broadcasting, telecommunications network for a telecommunications carrier, intranet, and the Internet. Broadcasting network includes terrestrial digital broadcasting such as so-called "one-seg" broadcasting, BS (Broadcasting Satellite) digital broadcasting, CS (Communication Satellite) digital broadcasting, and analog broadcasting. The content is, for example, a set of information, which the user enjoys, including of video, image, music or text, or their combinations, which is transmitted via a network or stored in a terminal. Further, the split view includes, for example, a case when displaying the content by dividing the screen, and a case when displaying the content superposed with PiP (Picture in Picture).

The electronic device may have an arrangement further comprising, a selection information determining means for determining whether the third content includes selection information for an object selectable by user operation. When it is determined that the third content includes the selection information, the display controlling means displays in the second displaying means the third content solely, or presents a split view by splitting the screen of the second display means into parts for the third content and the second content, and when it is determined that the third content does not include the selection information, the display controlling means displays in the first displaying means the third content solely, or presents a split view by splitting the screen of the first display into parts for the third content and the first content.

In accordance with such an arrangement, when there is selection information included in the third content, the content is allowed to be displayed in the touch panel. Therefore, the user is able to manipulate to the third content, for example, by touching the selection information with a fingertip or a stylus. The selection information includes hyperlink information to a web page, image data and text data, and various launching command information.

The electronic device may have an arrangement further comprising, a displaying form designating means for the user to designate a displaying form of the content. The display controlling means displays the content based on a condition, which the user designated in the displaying form designating means when the content acquiring means acquires the third content.

The third content is, for example, content including associated information related to the first content or the second content. The third content includes all kinds of image data (including still image and motion picture image) and text data, such as image data extracted from the first content, image/text data associated with the second content, an electronic mail file and image/text data received via a network, image data showing in-call, image data for number keys needed for dialing, etc., image data showing receiving of an electronic mail, and image data for launching application software such as electronic mail software and game software.

The electronic device may have an arrangement further comprising, a recording means for recording as a captured image at least one frame of images of the first content displayed in the first displaying means, and wherein, the second displaying means displays the recorded captured image as the third content according to the determination of the selection information determining means.

Further, the electronic device may have an arrangement further comprising, a data for search creating means for creating data for search based on the captured image; and a communicating means for transmitting the created data for search via certain network to a search server, and for receiving a search result corresponding to the data for search from the search server; and wherein, the second displaying means displays the received search result as the third content according to the determination of the selection information determining means.

According to this arrangement, in a case where associated information of the captured image of the first content displayed in the first displaying means is searched based on the captured image, it is possible to display in the second displaying means the captured image and the search result information, and also, display the first and the second content simultaneously in either of the displaying means, and therefore, the user is able to continue browsing the first and the second content with the search result. In this case, a button image for recording the captured image may be displayed in the second displaying means and operated to be pressed by the user, and the electronic device may include a mechanical button instead of means on the first or the second displaying means.

The associated information includes a list of websites which lists information related to objects such as a person, an animal and a figure included in the captured image, a website screen for purchasing things included in the captured image as a product, and a website screen for purchasing or acquiring content related to people and things included in the captured image. Further, the data for search includes data for the captured image itself, and a feature point data extracted from the captured image. When the electronic device includes a storage unit, such as a HDD and a flash memory, data stored in those storage units may be used as the associated information for the search.

Further, the electronic device may have an arrangement further comprising, an area designating operation input means for designating certain area of a targeted area image out of the displayed captured image, and wherein, the data for searching creating means creates the data for searching using the targeted area image extracted by the area designating operation input means.

Thereby, in cases when there is a plurality of person and things included in the captured image and when the size of the person and the thing in the captured image is small, by means of extracting certain area of a targeted area image from the captured image, it becomes possible to identify the search subject, and to improve search efficiency.

In the electronic device, the area designating operation input means may extract as the targeted area image an image included in an area which is encircled by a user's finger or a stylus in the second displaying means in which the captured image is displayed.

Thereby, the user is able to extract the targeted area image easily by just performing an operation surrounding a part of the captured image by a finger or a stylus.

Further, the area designating operation input means may display a frame that has certain size and is centered in a point contacted by the user's finger or the stylus in the second displaying means in which the captured image is displayed.

Thereby, the user is able to extract the targeted area image easily by just touching a point in the captured image by a finger or a stylus.

In the electronic device, the communicating means may be capable of transmitting and receiving a call signal of a telephone, and when there is an incoming call signal via the communicating means or a call signal is to be outgone via the communicating means, the display controlling means may display in the second displaying means the image data showing the incoming or the outgoing as the third content while replacing the second content, and present a split view by splitting the screen of the first displaying means into parts for the first and the second content, respectively.

Thereby, when there is an incoming call to the electronic device or when initiating a call to other device, it becomes possible to display the image representing those events in the second displaying means, and also enables the user to continue watching (includes listening) the second content and the first content in the first displaying means.

The electronic device may be arranged such that the communicating means is capable of transmitting and receiving electronic mail data, and when there is an incoming electronic mail or an outgoing electronic mail, the display controlling means displays in the second displaying means the image data showing the incoming or the outgoing as the third content while replacing the second content, and presents a split view by splitting the screen of the first displaying means into parts for the first and the second content, respectively.

Thereby, when an electronic mail is transmitted or received, it becomes possible to display the image representing those events in the second displaying means, and also enables the user to continue watching the second content and the first content in the first displaying means.

Further, in this case, it may have an arrangement such that, based on user operation to the second displaying means, the display controlling means displays in the second displaying means a creation screen for creating outgoing electronic mail data as the third content while replacing the second content, and presents a split view by splitting the screen of the first displaying means into parts for the first and the second content, respectively.

Thereby, even when creating an electronic mail data to be outgone, it enables the user to continue watching the first content and the second content in the first displaying means.

The electronic device may be arranged such that the second content includes hyperlink information to an outside content, and when an operation to the hyperlink information is input in the second displaying means by the user, the display controlling means displays in the second displaying means the outside content corresponding to the hyperlink information as the third content while replacing the second content, and presents a split view by splitting the screen of the first displaying means into parts for the first and second content.

Thereby, even when displaying external content corresponding to hyperlink information as third content, it enables the user to continue watching the first content and the second content in the first displaying means.

The electronic device may be arranged such that the second content includes launching command information for launching certain application software in the electronic device, and when an operation corresponding to the launching command information is input by the user in the second displaying means, the display controlling means displays in the second displaying means the launching screen corresponding to the launching command information as the third content while replacing the second content, and presents a split view by splitting the screen of the first displaying means into parts for the first and second content.

Thereby, even when launching various kinds of application software based on launching command information included in the second content, it enables to continue displaying the first content and the second content.

The electronic device may be arranged such that, in order to display the third content, the display controlling means determines whether there is a relationship between the first content displayed in the first displaying means and the second content displayed in the second displaying means, and when it is determined that there is a relationship, displays in the second displaying means the third content while replacing the second content, and presenting a split view by splitting the screen of the first displaying means into parts for the first and second content, and when it is determined that there is no relationship, displays in the second displaying means the third content while replacing the second content, and preserving the display of the first content displayed in the first displaying means.

Thereby, when there is a relationship between the first content and the second content, it enables the user to watch the third content in the second displaying means, and also, watch the related first content and second content in the first displaying means, i.e., together in a single displaying means. Further, when there is no relationship between the first content and the second content, the display for the second content is cleared and it becomes possible for the user to watch the first and the third content in the first and second displaying means, respectively, in the large screen, which the user is able to watch easily. In this case, at least either of the first content and the second content is needed to be included with flag information showing the relationship between the two. Further, in a case where there is no flag information included, the relationship with the second content may be determined by, for example, performing image analyzing process to the first content.

Furthermore, in this case, it may be arranged such that, in order to display the third content in the second displaying means, the display controlling means controls to display in the first displaying means or the second displaying means a screen for allowing the user to select whether to present a split view by splitting the screen of the first displaying means into parts for the first and the second content, or displaying in the first displaying means the first content without displaying the second content.

Thereby, it enables the user to select the displaying and not-displaying the second content according to user preference, and therefore, it becomes convenient for the user.

Further, for example, the first content is a television program broadcasting that a broadcasting station broadcasts, and the second content is a data broadcasting that is broadcast together with the television program broadcasting.

Furthermore, the electronic device may be arranged to further comprise, a direction detecting means for detecting a direction of the first displaying means to the body of the electronic device. When the content acquiring means acquires the third content, the display controlling means displays the content according to the condition that the detection result of the detecting means satisfies.

An electronic device according to another aspect of the invention is a device comprising: a content acquiring means capable of acquiring content on a network or content located locally; a plurality of displaying means capable of displaying the content, at least one of the plurality of displaying means being arranged as a touch panel; a displaying target setting means configured such that, when the content acquiring means acquires new content in a state where content is displayed in each of the displaying means, the displaying target setting means sets the displaying means which is to be a displaying target for the new content according to whether the new content includes content which can be operated via the touch panel or not; and a split view determining means for determining the content to be displayed as a split view in one screen according to the setting so that all of the current displaying content and new content is displayed in one or more of the displaying means.

A displaying system according to another aspect of the invention comprises a first electronic device, wherein, the first electronic device comprising: a content acquiring means capable of acquiring content via a network or from inside of the electronic device, or generated inside the electronic device; a first displaying means capable of displaying the acquired first content; and a first communicating means for data communicating with the second electronic device; and wherein, when the content acquiring means acquires the second content, the first communicating means transmits the second content to the second electronic device. The second electronic device comprising: a second communicating means for data communicating with the first electronic device, the second communicating means receiving the second content transmitted by the first communicating means; and a second displaying means arranged as a touch panel which is capable of accepting an input operation of a user, and displays the received second content; and wherein the first electronic device comprises a display controlling means for controlling the first displaying means and controlling the second electronic device which underwent a data communication by the first communicating means, based on a predetermined condition, when the content acquiring means acquires third content in a state where the first and second content are displayed in the first and second displaying means, respectively, the first electronic device performing one of: (1) displaying in the second displaying means the third content while clearing the second content, (2) presenting a split view by splitting a screen of the first display means into parts for the first and second content and displaying in the second displaying means the third content, and (3) presenting a split view by splitting a screen of the second displaying means into parts for the second and third content.

The first electronic device is, for example, a non-portable type electronic device such as a PC (Personal Computer), and the second electronic device is a portable type electronic device such as a remote controller, a mobile phone, a game appliance, and a PDA. In such an arrangement, upon acquiring the third content, based on certain condition, the display controlling means presents a split view by splitting the screen of the first display means into parts for the first content which is displayed in the first displaying means and the second content which is displayed in the second displaying means without ceasing the display, for example, in the first displaying means, or alternatively, displays the first content in the first displaying means and presents a split view by splitting a screen of the second display means into parts for the second and the third content. When such a display control is performed, the user is able to continue browsing the first and the second content while browsing the third content, and thereby, it becomes possible to avoid missing desired content.

Further, the electronic device may be arranged such that, the first electronic device further comprises a selection information determining means for determining whether the third content includes selection information for an object selectable by user operation, and wherein when it is determined that the third content includes the selection information, the display controlling means displays in the second displaying means the third content solely, or presents a split view by splitting a screen of the second display means for the third content and the second content, and when it is determined that the third content does not include the selection information, the display controlling means displays in the first displaying means the third content solely, or presents a split view by splitting a screen of the first display means into parts for the third content and the first content.

A displaying method according to a main aspect of the invention comprises: a first content acquiring step for acquiring first content and second content acquired via a network or from inside of an electronic device, or generated inside of an electronic device; a first displaying step for displaying the first content; a second displaying step for displaying the acquired second content in a second displaying screen arranged as a touch panel which is capable of accepting an input operation of a user; a second content acquiring step for acquiring third content; and a display controlling step which, based on a predetermined condition, performs one of: (1) displaying in the second displaying means the third content while clearing the second content, (2) presenting a split view by splitting a screen of the first display means into parts for the first and second content, and displaying the third content in the second displaying means, and (3) presenting a split view by splitting a screen of the second displaying means into parts for the second and third content.

According to such a method, upon acquiring the third content, based on certain condition, it becomes able to present a split view by splitting the screen of the first displaying screen into parts for the first content that is displayed in the first displaying screen and the second content that is displayed in the second displaying screen without ceasing to display the content, and also, display the third content in the second displaying screen, or alternatively, display the first content in the first displaying screen, and also, present a split view by splitting the second displaying screen into parts for the second and the third content. When such a display control is performed, the user is able to continue browsing the first and the second content while browsing the third content, and thereby, it becomes possible to avoid missing desired content.

The displaying method may further comprise a selection information determining step for determining whether the third content includes selection information for an object selectable by user operation. When it is determined that the third content includes the selection information, in the display controlling step, the third content solely is displayed in the second displaying screen, or the third content is displayed as a split view in the second display with the second content, and when it is determined that the third content does not include the selection information, in the display controlling step, the third content is displayed solely in the first displaying screen, or the third content is displayed in the first displaying screen with the first content.

Further, a linked operation executing program according to a main aspect of the invention is a program for a computer to execute the above displaying methods.

BRIEF DESCRIPTION OF ACCOMPANYING DRAWINGS

Figure 5:
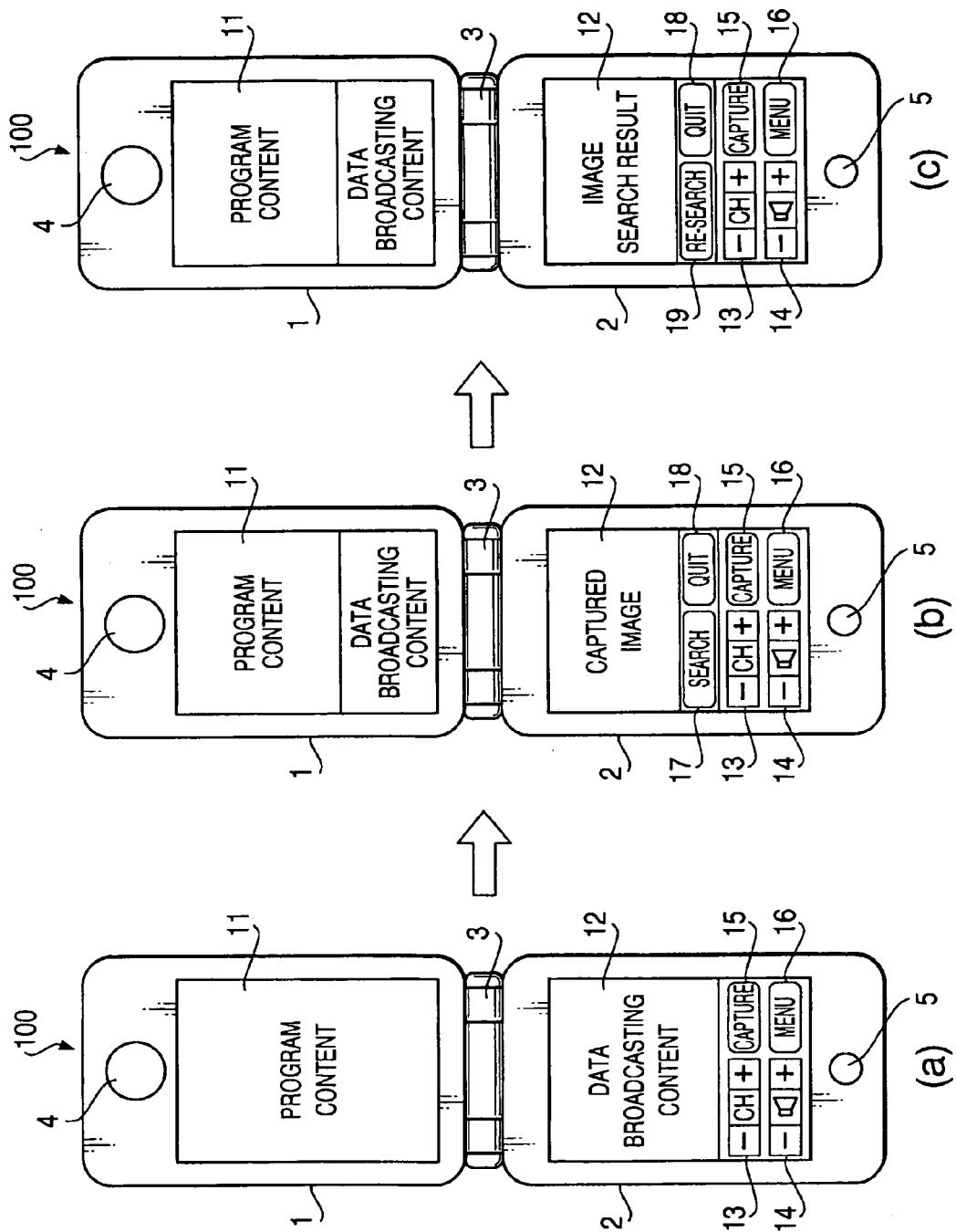

FIG. 5 is a diagram showing transitions of a display example of a first displaying unit 11 and a second displaying unit 12 when the mobile phone 100 performs an image capture process and an image searching process when receiving the broadcast according to a first embodiment of the invention.

FIG. 6 is a diagram showing an example which displays incoming screen as "other content" instead of a captured image or a search result image according to a first embodiment of the invention.

FIG. 7 is a diagram showing an example which displays web content as "other content" instead of a captured image and a search result image according to a first embodiment of the invention.

Figure 8:
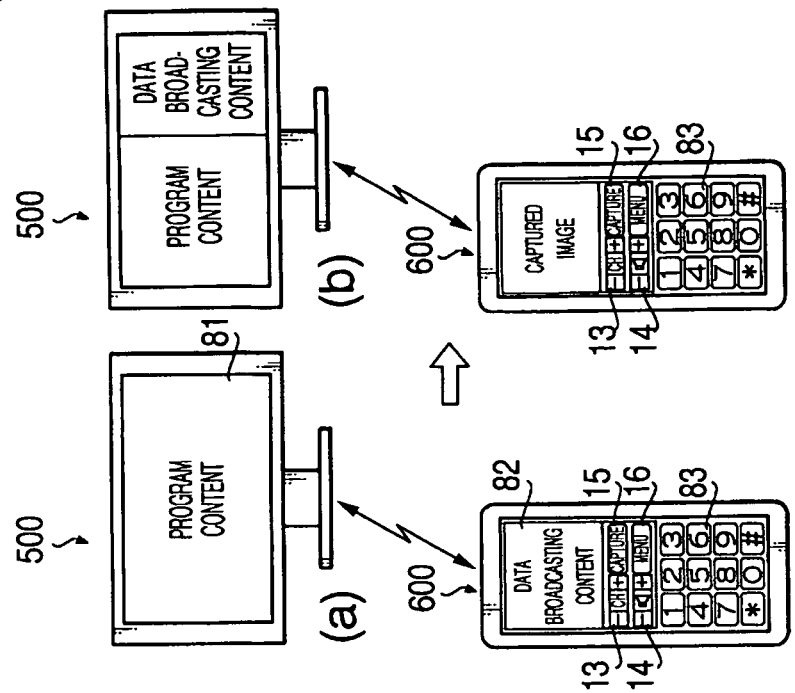

FIG. 8 is a diagram showing an arrangement and an operation of a displaying system according to a second embodiment of the invention.

Figure 9:
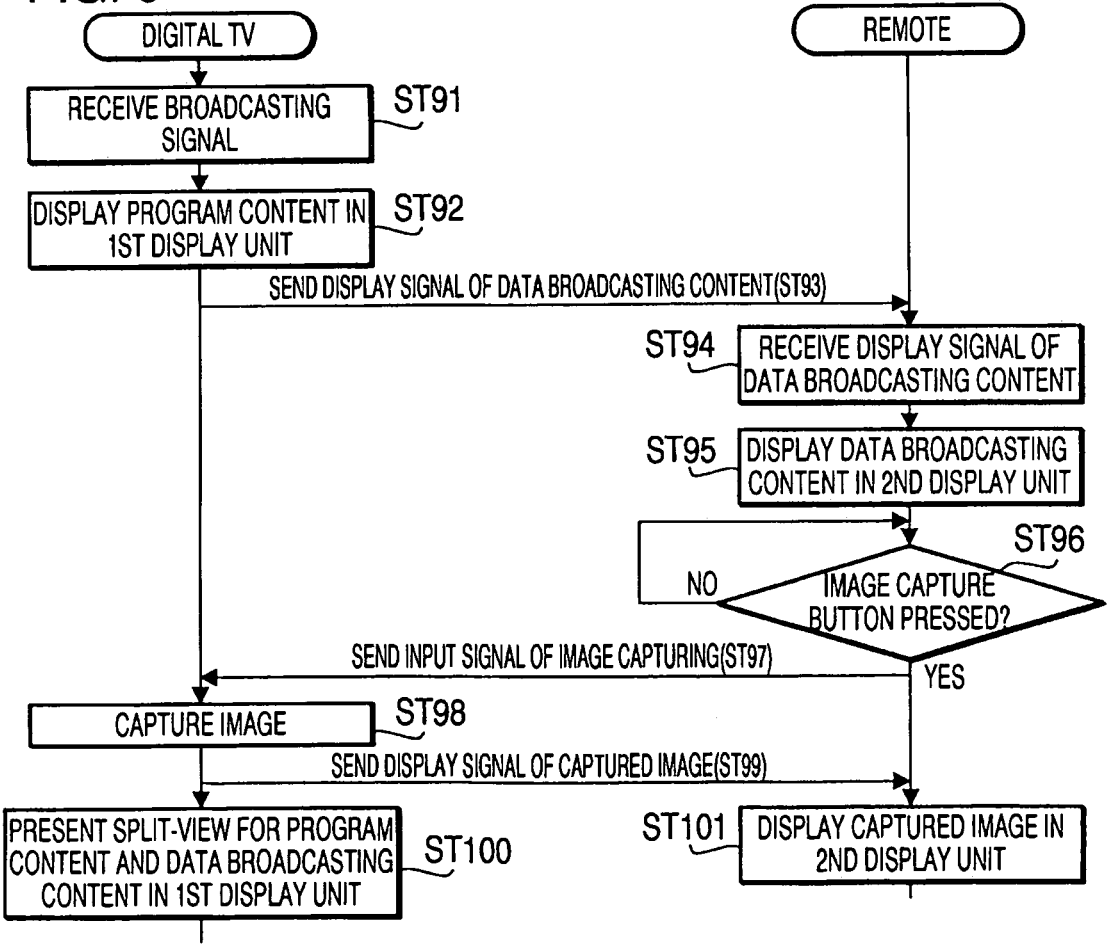

FIG. 9 is a sequence diagram showing an operation of the displaying system according to a second embodiment of the invention.

DETAILED DESCRIPTION OF PREFERRED EMBODIMENTS

In the following, embodiments of the present invention are described referring to the figures.

Embodiment 1

Figure 1:
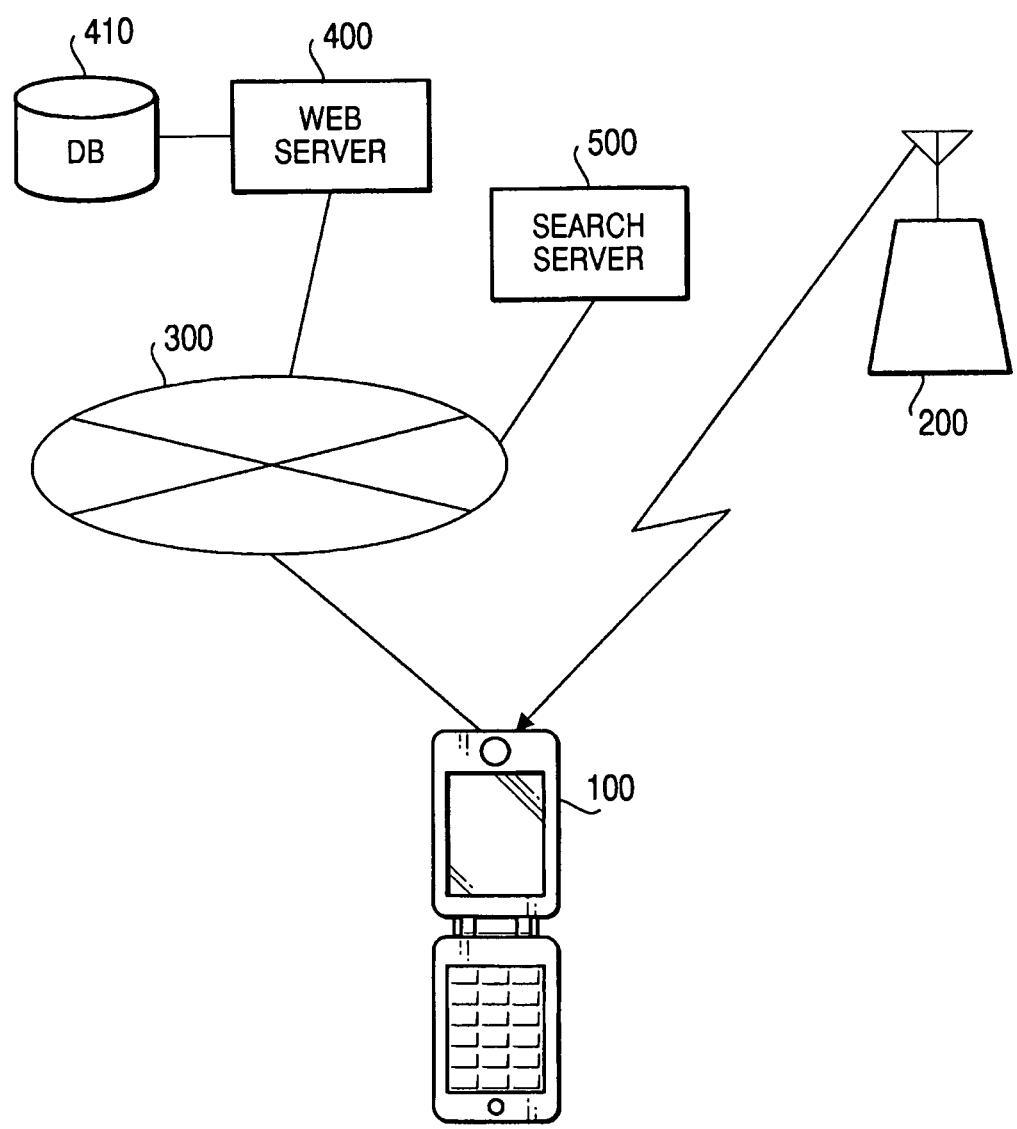
FIG. 1 is a diagram showing a schematic arrangement of a digital broadcasting receiving system according to a first embodiment of the invention.

First, a first embodiment of the invention is described. FIG. 1 is a diagram showing a schematic arrangement of a digital broadcasting receiving system according to the present embodiment of the invention.

As shown in FIG. 1, a displaying system according to the embodiment of the invention comprises a mobile phone 100, a broadcasting station 200, a web server 400, and a search server 500. The broadcasting station 200 uses, for example, ISDB-T (Integrated Services Digital Broadcasting-Terrestrial) which is a standard for terrestrial digital broadcasting, and provides terrestrial digital broadcasting service for mobile appliances, such as the mobile phone 100 ("one-seg" broadcasting), in addition to providing the service to nonportable type television receivers. The broadcasting station 200 modulates and multiplexes according to a standard such as OFDM (Orthogonal Frequency Division Multiplexing), video signal and sound signal of a broadcasting program, and data broadcast signal and a closed-captioned broadcast signal, such as for program related information, news, and weather forecast, etc., on to a carrier which is radio wave in certain frequency, and broadcasts as broadcast signal. The data broadcast signal is produced using, for example, BML, as a description language, and includes, for example, link information to URLs (Uniform Resource Locators) of websites relating to the program. The website relating to the program includes a website of the program provider, and for example, a website of a sponsor of the program, and a website for purchasing products related to the program. A data broadcast signal may include, for example, EPG (Electronic Program Guide) information.

The website is serviced by the web server 400 connected to the mobile phone 100 via a network, such as the Internet 300. The web server 400 includes a database 410 for storing content, such as each of the web pages and various image data constituting the website.

The mobile phone 100 receives broadcast signal from the above broadcasting station 200, displays the content of the program broadcast and the data broadcast, and acquires the content on the website which is linked to the data broadcast content from the above web server 400 to display them.

Figure 2:
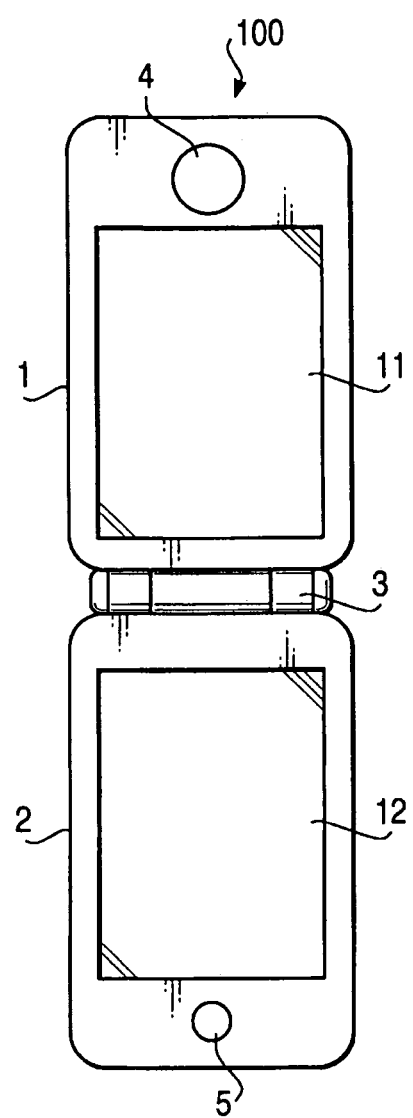
FIG. 2 is a diagram showing in detail an external view of a mobile phone 100 according to a first embodiment of the invention.

FIG. 2 is a diagram showing in detail an external view of the mobile phone 100. As shown in the figure, the mobile phone 100 is so-called foldable type mobile phone in which a first housing 1 and a second housing 2 are rotatably connected (enabling opening and closing) via a hinge unit 3.

At inside of the first housing 1, there is provided a speaker 4 for outputting received voice signal during a call and voice signal of a broadcasting program, and a first displaying unit 11 comprised of, for example, STN (Super Twisted Nematic) liquid crystal or TFT (Thin Film Transistor) liquid crystal. In the first displaying unit 11, video signal for broadcasting program content (Hereinafter, "program content".) and, for example, various menu screens for functions, such as call functions and mail functions, among the broadcast signal received from the broadcasting station 200, are displayed.

Further, in the inner surface of the second housing 2, there is provided a microphone 5 for collecting sound of transmitting voice of the user during phone calls, and a second displaying unit 12 that function as a liquid crystal displaying unit and a touch panel. In the second displaying unit 12, content of data broadcast and closed-captioned broadcast (Hereinafter, they are called "data broadcast content".) among broadcast signal received from the broadcasting station 200, and images for operation input of, for example, number keys and direction keys needed for dialing and for creating electronic mails, and the user is able to operate the mobile phone 100 by touching the second displaying unit 12 with, for example, a fingertip or a stylus.

Figure 3:
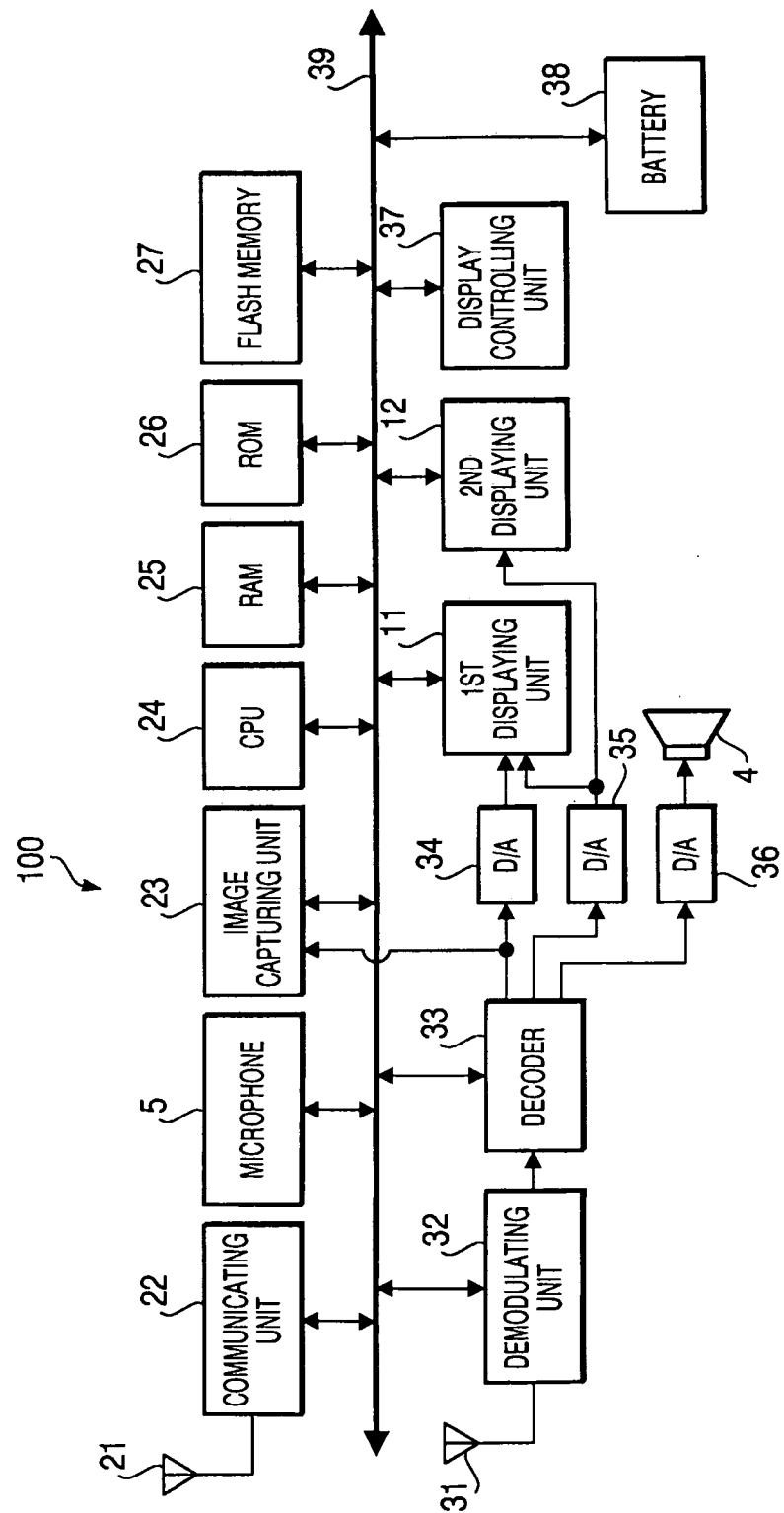
FIG. 3 is a block diagram showing a hardware arrangement of the mobile phone 100 according to a first embodiment of the invention.

FIG. 3 is a block diagram showing a hardware arrangement of the mobile phone 100.

In this figure, a phone antenna 21 is, for example, an internal antenna, and the phone antenna 21 transmits and receives radio wave for telephone calls and packet telecommunications. A communicating unit 22 performs frequency conversion, and modulation and demodulation of radio waves transmitted and received by the phone antenna 21. Further, data transmitted and received in packet telecommunication is data, such as electronic mail data, program data, image/text data stored in, for example, database 410 of the web server 400, and other various data.

The microphone 5 includes, for example, an A/D (analog/digital) converter and an amplifier, and converts the transmission analog voice data which is input by the user to digital voice data, and sends it to a CPU (Central Processing Unit) 24. The digital voice data sent to the CPU 24 is encoded, and thereafter sent via the communicating unit 22 and the phone antenna 21.

A broadcast antenna 31 receives the broadcast signal broadcasted from the broadcast station 200 and outputs to a demodulation unit 32. The demodulation unit 32 demodulates the received broadcast signal and outputs to a decoder 33. The decoder 33 decodes the demodulated broadcast signal, and separates it to video signal and voice signal of the program content, and video signal of the data broadcast content.

The video signal for the program content, the voice signal of the program content, and the video signal of the data broadcast content are output to a D/A Converter 34, a D/A Converter 36, a D/A converter 35, respectively, as digital signal, and each of them are converted in the respective D/A converters. Further, the video signal of the program content, the voice signal of the program content, and the video signal of the data broadcast content are output to the first displaying unit 11, a speaker 4, and the second displaying unit 12, respectively, and they undergo displaying process and voice output process.

When the mobile phone 100 is not receiving the broadcast signal, the first displaying unit 11 is able to display various screens, such as various menu screens, an incoming call screen, a during-call screen, a mail creating screen, a mail transmitting/receiving screen, a telephone book screen, and a game screen.

Further, as described in the above, the second displaying unit 12 functions also as a touch panel. When the mobile phone 100 is not receiving broadcast signal, the second displaying unit 12 displays images for operation input, for example, number keys and direction keys, and when the user touches on the second displaying unit 12 by a fingertip or a stylus, the second displaying unit 12 detects the touched location, and sends to the CPU 24 a direction for executing a predetermined process for the image for operation input located in that location. When the mobile phone 100 is receiving broadcast signal, the second displaying unit 12 is able to display images for operation input, for example, a channel-adjusting button, and a volume-adjusting button, in addition to the video signal of the data broadcast content.

The speaker 4 is able to output various sound signal, such as received voice during a call, ring sound, and music data, in addition to sound signal of the program content.

An image capturing unit 23 captures an image from video signal of the program content that is decoded by the decoder 33 in response to the user operation, and performs a process for recording into a RAM (Random Access Memory) 25 and a flash memory 27. The recorded captured image is used for performing image searches in the Internet 300 via the communicating unit 22. Details for the image capturing process and the image searching process will be described later.

The display controlling unit 37 is in charge of the generation process of image data for displaying in the first displaying unit 11 and the second displaying unit 12, for example, video signal decoded by the decoder 33, various menu screens, and various image content. Also, for example, when an image capturing process is executed in the image capturing unit 23, the display controlling unit 37 controls to display the captured image in the second displaying unit 12 in place of the video signal of the data broadcast content, and controls the necessary switching of content displayed in the first displaying unit 11 and the second displaying unit 12, for example, by controlling so as to present a split view by splitting the screen of the first displaying unit 11 into parts for the video signal of the data broadcast content that had been output from the D/A converter 35 and had been displayed in the second displaying unit 12, and the video signal of the program content. Details of this display controlling process will also be described later.

The battery 38 is, for example, a lithium ion battery, and supplies power to each unit in the mobile phone 100.

The CPU 24 communicates signal with each unit in the mobile phone 100 in processes, such as encoding and decoding process of voice data of a call, packet telecommunication process, broadcast receiving process, and display controlling process, and controls the mobile phone 100 integrally. The RAM 25 is used as a work area for the CPU 24, and is a volatile memory that reads various kinds of data from a flash memory 27 and a ROM (Read Only Memory) 26 and stores temporarily. The ROM 26 is a non-volatile memory that stores, for example, control programs for the CPU 24 to control each unit and various kinds of initial setting data. Alternatively, instead of providing with the ROM 26, for example, control programs, may be stored in the flash memory 27.

The flash Memory 27 is a non-volatile memory that stores various kinds of data, such as image data, electronic mail data, telephone book data, video data and sound (song) data, and program data, such as OS (Operating System) and various kinds of application programs needed for, for example, a call, packet communications, and broadcast receiving and presenting. In addition, as described earlier, since data broadcasting is described in BML, in the flash memory 27, a BML browser is stored as an application program, and a HTML (Hyper Text Markup Language) browser for browsing web pages linked with URLs included in the data broadcasting is also stored. The BML browser and the HTML browser may be separate individual application software but they may be existed as application software that has functions of both browsers combined. The mobile phone 100 may include a HDD (Hard Disk Drive), instead of the flash memory 27 or in addition to the flash memory 27.

Furthermore, among the received broadcast signal, the digital video/sound signal before undergoing the decoding by the decoder 33 is able to record in the flash memory 27 based on, for example, an operation input to the second displaying unit 12. The recorded video/sound signal is passed to the decoder 33 based on, for example, an operation input to the second displaying unit 12, and it is possible to playback the recorded vide/sound signal.

Figure 4:
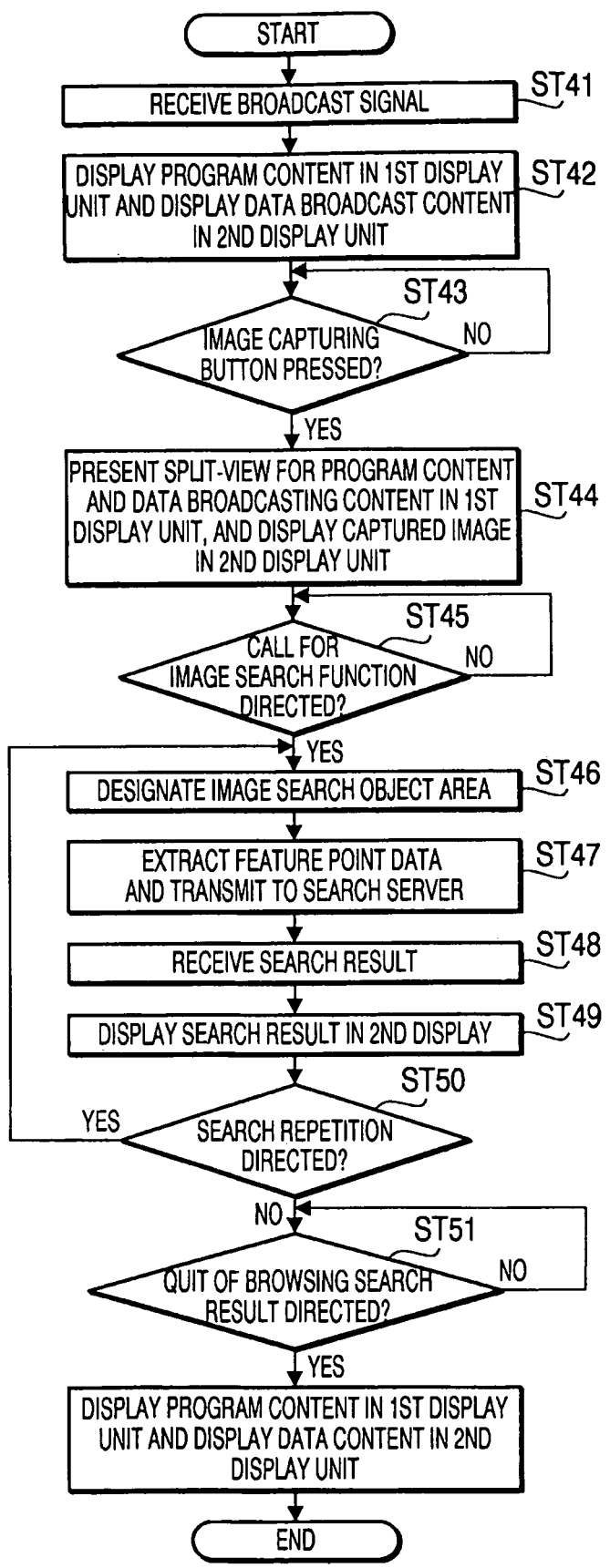
FIG. 4 is a flowchart showing a broadcasting receiving operation of the mobile phone 100 according to a first embodiment of the invention.

In the following, in particular, the operation during the broadcasting receiving of the mobile phone 100 arranged as described above will be described. FIG. 4 is a flowchart showing an operation executed when the mobile phone 100 receives the broadcasting. In FIG. 4, a case when the user directs image capturing process and image searching process when the mobile phone 100 receives the broadcasting, is described. FIG. 5 is a diagram showing transitions for examples of displays in the first displaying unit 11 and the second displaying unit 12 in a case when performing the image capturing process and the image searching process during receiving the broadcasting.

First, when the broadcast signal is received by the antenna for broadcasting 31 (step 41), the CPU 24 of mobile phone 100 undergoes processes, such as a demodulation process by the demodulating unit 32 and a decoding process by the decoder 33, displays the program content in the first displaying unit 11 and displays the data broadcast content in the second displaying unit 12, as shown in FIG. 5(*a*) (step 42). Also, in a lower portion in the display area of the data broadcast content in the second displaying unit 12, channel adjusting buttons 13 for switching the channel of the program content displayed in the first displaying unit 11, volume adjusting buttons 14 for adjusting volume of sound of the program content output from the speaker 4, an image capturing button 15 for capturing images of the program content displayed in the first displaying unit 11 with the image capturing unit 23, and a menu button 16 for displaying in the second displaying unit 12, a menu screen of the mobile phone 100 for, such as a call or an electronic mail, are also displayed.

Subsequently, the CPU 24 confirms whether or not the image capturing button 15 is pressed by the user (step 43), and when it is determined that the button is pressed (Yes), the CPU 24 executes the image capturing process through the image capturing unit 23, and cooperates with the display controlling unit 37, to present a split view, in the first displaying unit 11, by arranging the program content and the data broadcast content in, for example, an up and down direction, and to display in the second displaying unit 12, the captured image instead of the data broadcast content, as shown in FIG. 5(*b*) (step 44). Also, the CPU 24 displays in the second displaying unit 12, a search button 17 for calling image searching function based on the captured image, and a quit button 18 for quitting displaying the captured image and the image searching process.

Furthermore, when the image capturing button 15 is pressed, the CPU 24 captures frame for a few seconds before and after the time of the pressing so that the search is enabled once again later with another captured image, and holds, for example, RAM 25.

Then, the CPU 24 confirms whether the image searching function is called by the user by pressing the search button 17 or not (step 45). When the search button 17 is pressed, the CPU 24 requests the user to designate an area that is subject to the image search inside the captured image (step 46).

Specifically, an area where the user surrounded on the captured image, for example, by user's fingertip or the stylus, is extracted as the targeted area image. Alternatively, a frame for certain area surrounding a point where the user touched on the captured image by a fingertip or a stylus is generated, and the image inside the frame is extracted as the targeted area image.

Subsequently, after confirming to the user whether he/she would prefer to use the extracted targeted area image as the image search target or not, the CPU 24 performs an image recognition process to the targeted area image, extracts a feature point data of the image, and sends the feature point data as the data for search via the communicating unit 22 to the search server 500 in the Internet 300 (step 47). Furthermore, when the targeted area image is extracted, the CPU 24 may execute the extracting process of the feature point data and transmission process of the feature point data to the search server, immediately without confirming to the user.

The search server performs a pattern matching process between the feature point data received from the mobile phone 100 and the feature point data held in advance, and sends to the mobile phone 100, data, such as URLs of websites including information related to people, animals, goods, etc., included in the targeted area image, as a search result. For example, in a case where a targeted area image is an image formed by extracting a particular person (a program entertainer) from the captured image, the search server sends a list of URLs including a website managed by the entertainer of the program and a website for purchasing as products, such as DVDs (Digital Versatile Disks) of movies, dramas, etc. in which the entertainer appears, to the mobile phone 100 as a search result.

The CPU 24 receives the search result via the communicating unit 22 (step 48), and, as shown in FIG. 5(C), the CPU 24 displays the search result in the second displaying unit 12, in place of the captured image (step 49). At this moment, the CPU 24 displays a search repeat button 19 for performing image search again with a captured image that is different from the captured image used for the search in the lower part of the search result image in place of the search button 17.

Further, instead of extracting a feature point data by the mobile phone 100, the targeted area image itself may be sent to the search server, and the search server may perform the extracting process of the feature point data.

When the user performs an operation, such as clicking on a URL included in the search result, the CPU 24 acquires a web page linked to the URL or certain data, such as image data or text data, with the communicating unit 22 via the Internet 300 and displays the web page or the certain data instead of the search result image in the second displaying unit 12.

Subsequently, the CPU 24 confirms whether the search repetition is directed by the user by pressing the search repeat button 19 (step 50), and when the search repetition is directed (Yes), control returns to the above step 46 and the CPU 24 performs the designation process for the search targeted area and the processes following it.

When the search repetition is not directed in step 50 (No), the CPU 24 confirms whether quitting of the browsing process for the search result is directed by the user by pressing the above quit button 18 or not (step 51), and when the quitting is directed (Yes), the CPU 24 ceases displaying the search result image, displays the program content in the first displaying unit 11 as with the above step 42, and displays the data broadcast content in the second displaying unit 12 (step 52).

With the above described performances, when the program content is displayed in the first display 11 and the data broadcast content is displayed in the second displaying unit 12, even when there is a need to display "other content" such as the above described captured image and the search result image, by continuing displaying the data broadcast content by means of split-screen displaying of the data broadcast content with the program content in the first displaying unit 11, it is possible to avoid the user missing either of the program content or the data broadcast content.

It is noted that the content which is displayed in the second displaying unit 12 as "other content", is not limited to the above described captured image and the search result image. FIGS. 6 and 7 are diagrams showing display examples where contents other than the captured image and the search result image are displayed as "other content".

As shown in FIG. 6(a), in a condition in which the program content is displayed in the first displaying unit 11 and the data broadcast content is displayed in the second displaying unit 12, when there is an incoming phone call, the CPU 24 presents, in the first displaying unit 11, a split-view by splitting the screen into parts for the program content and the data broadcast content, and displays, in the second displaying unit 12, an incoming screen showing the incoming phone call in place of the data broadcast content, as shown in FIG. 6(b). Meanwhile, for example, the CALL button 61 and the HOLD button 62 are displayed in the lower portion of the incoming screen. In this case, the phone moves to a during-call state when the user presses the CALL button 61, and the phone moves to a hold state when the user presses the HOLD button 62. Further, when the phone becomes a during-call state or a hold state, a HANG UP button (not illustrated) for hanging up a call, for example, is displayed, and when a call is ended by the user's press of the HANG UP button, the CPU 24 returns into a state of prior to the call incoming, that is, a state in which the data broadcast content is being displayed in the second displaying unit 12.

Further, as shown in FIG. 7(a), in a state where the program content is displayed in the first displaying unit 11 and the data broadcast content is displayed in the second displaying unit 12, when the user, for example, presses (clicked) link information (URL) in the data broadcast content displayed on the second displaying unit 12, the CPU 24 presents, on the first displaying unit 11, a split view by splitting the screen into parts for the program content and the data broadcast content, and acquires a web page corresponding to the link information via the communicating unit 22, and displays the web page instead of the data broadcast content in the second displaying unit 12, as shown in FIG. 7(b).

Furthermore, the data broadcast content may include application-launching-commands for launching particular applications included in the mobile phone 100, such as "mailto:", "telto:", and "media:". "mailto:" is a command for launching an electronic mail software (mailer), "telto:" is a command for launching a call (dialing) application, and "media:" is a command for launching a media related application. Therefore, when the user performs a pressing operation for those application software launching commands, also, the CPU 24 presents, in the first displaying unit 11, a sprit view by splitting the screen into parts for the program content and the data broadcast content, and displays, in the second displaying unit 12, a launching screen for the application software that corresponds to the application-launching command in place of the data broadcast content. Further, those commands may include a command for displaying EPG content.

When a command for launching an application such as a mailer, a call application, and a media related application, is selected, a program which belong to lower layers such as OS and middleware, compared with the application, gives a direction to the application software (In this case, a TV application software.) that displays content to displaying units, to change at least one of displaying location, displaying area, and displaying content for those content. Further, simultaneously, the program belonging to the lower layer also gives, to the application that is started by the above described command, instructions concerning locations and regions where the content is to be displayed, and the size in which the content is to be displayed. When the application software receives the direction, the content is displayed in a form according to the direction. Various displaying forms can be made by changing setting values which OS and middleware, etc., gives to the application. These setting values can be changed by user operation, etc.

For example, there may be following displaying forms. For example, when "other content" is additionally displayed during a display state where the program content is displayed in the first displaying unit 11 and the data broadcast content is displayed in the second displaying unit 12, the phone does not change the displaying form of the first displaying unit 11, and presents, in the second displaying unit 12, a split view by splitting the screen into parts for the data broadcast content and "other content". This displaying form is quite advantageous, for example, when both the data broadcast content and "other content" are content which accepts user operation.

Regarding the above described displaying form, when a program such as OS and middleware determines that, for example, "other content" is content which accepts user operation (e.g., content including information such as hyperlink information and various kinds of launching-command information), the phone presents, in the second displaying unit 12, a slit view by splitting the screen into parts for the data broadcast content and "other content". Further, according to settings of OS and middleware, for example, the phone may present, in the first displaying unit 11, a split view by splitting the screen into parts for the program content and the data broadcast content, and display "other content" solely in the second displaying unit 12. Furthermore, when it is judged that "other content" is content which does not accept user operation, for example, the phone may present, in the first displaying unit 11, a split view by splitting the screen into parts for the program content and "other content" or may delete the program content display "other content" solely in the first displaying unit, so that the displaying form of the second displaying unit 12 is kept unchanged.

Further, when "other content" is to be displayed, the user may be allowed to select whether to display, as a split view, "other content" together with the program content or the data broadcast content, or to display "other content" while clearing one of the program content and the data broadcast content.

Furthermore, while displaying the program content in the first displaying unit 11 and the data broadcast content in the second displaying unit 12, when user operation, such as a channel switching and a link selection in the data broadcast content, is accepted, the program content corresponding to the channel switching operation is displayed in the first displaying unit 11, and content for the link destination is displayed in the second displaying unit 12. That is, the same type of content is continuously displayed, and no split-display of the content is performed in neither of the displaying units. Specifically, when, for example, the selecting operation to display application software that is related to the application software is done, a same type of content is displayed continually as described above. Further, according to another embodiment of the invention, for example, when a link is selected in the second displaying unit 12, both the original content and the link content may be displayed as a split view in the second displaying unit 12. Specifically, when a predetermined content with another function is started in application software (for example, when an EPG function is started in TV application software), application software that has been launched and application software supporting EPG may be displayed as a split view in the second displaying unit 12.

As other than examples shown in FIGS. 6 and 7, when the mobile phone 100 receives an electronic mail or a messenger message, when the user operates to start a mail creation screen, when the user operates to initiate a call (including operations for opening the telephone book), when the user operates to start various kinds of application software, such as a game, or when the OS outputs an alert message (e.g., for low battery and memory shortage) in a state where the program content is displayed in the first displaying unit 11 and the data broadcast content is displayed in the second displaying unit 12, the CPU 24 may present a split-view by splitting the screen in the first displaying unit 11 into parts for the program content and the data broadcast content, and display the corresponding contents (e.g., a mail receiving screen, a mail creating screen, a dialing screen, an application software launching screen, and alert message screen.) in the second displaying unit 12 in place of the data broadcast content. It is noted that an alert message is displayed in, for example, a dialogue box, in general, but in this case, the dialogue box hides a part of the content. When the arrangement of the present embodiment of the invention is adopted, the content being watched is displayed as a split view in the first displaying unit 11, and an alert message screen is displayed solely in the second displaying unit 12. As a result, it enables the user to continue watching the content without being disturbed. In addition, since a user's action is needed for those alert messages, it is advantageous to display in the second displaying unit 12, which is a touch panel.

There may be a case where there is a relationship between the program content and the data broadcast content broadcasted from the broadcasting station 200 (when they are jointly run) or a case where there is no relationship between the program content data and the data broadcast content broadcasted from the broadcasting station 200. A case where there is a relationship is, such as a case where profile information of a sports player who is playing in a sport game is broadcast as the data broadcast content when a live broadcasting program of the sports game is being broadcast as the program content. Also, a case where there is no relationship is, for example, a case where a drama program is broadcast as the program content and weather forecast and news, etc., are broadcast as the data broadcast content.

When there is a relationship between the program content and the data broadcast content, although the user may desire that both displays for the program content and the data broadcast content are continued even when there is a need to display "other content", but when there is no relationship between them, it is considered that there are cases where, for example, the user may permit the display for the data broadcast content be cleared.

Then, when the CPU 24 finds the relationship between the program content and the data broadcast content and determines that there are no relationship between those two, the CPU 24 may continue displaying the program content in the first displaying unit 11, and cease displaying the data broadcast content and display "other content" instead. For example, when the broadcasting station 200 side is broadcasting the program content and the data broadcast content while including a flag that shows the relationship between them, for example, in the data broadcast content, the above process may be executed by confirming the flag through the CPU 24. Further, when such a flag does not exist, for example, the CPU 24, performs an image recognition process to the program content video, and compares with a pre-stored database to recognize a person, a thing, etc., which the video presents as text information, and on the other hand, the CPU 24 may determine the relationship by extracting text information from the data broadcast content and looking at the match between those two.

As a result of this process, when there is no relationship between the program content and the data broadcast content, it enables the user to browse "other content" in the second displaying unit 12, and to continue watching the program content in the first displaying unit 11 with a large screen.

In other words, according to the present embodiment of the invention, when there is a relationship between the program content and the data broadcast content, by means of retaining to display both displays, the desire of a user who wants to enjoy those simultaneously will be accomplished. On the other hand, when there is no relationship between those content, the display for one of the content is cleared, and by means of displaying the other one of content and new content in their respective displaying unit, their visibility will be advantageously improved.

Furthermore, upon displaying "other content" in the second displaying unit 12, whether to present a split view by splitting the screen of the first displaying unit 11 into parts for the program content and the data broadcast content, or alternatively, to continue displaying the program content in the first displaying unit 11 and clear the display of the data broadcast content display and display "other content" instead in the second displaying unit 12, may be designated in advance by user operation. In this case, the need for determining the relationship between the displaying content will be eliminated and it is anticipated that the process load of the CPU 24 will be lessened.

Embodiment 2

In the following, a second embodiment of the invention will be described. In the above described first embodiment of the invention, the cases where displays for the program content, the data broadcast content and "other content" are switched in the mobile phone 100 having two displaying units are described, but in the present embodiment of the invention, the switching process of the displays is done in two appliances each has the displaying unit. It is noted that in the present embodiment of the invention, the similar arrangements and functions compared to the first embodiment of the invention are numbered same reference codes and the descriptions of those are eliminated or simplified.

FIG. 8 is a diagram illustrating an arrangement and an operation of a displaying system according to the present embodiment of the invention. As shown in FIG. 8, the displaying system according to the present embodiment of the invention comprises a digital television receiver (Hereinafter, "digital TV".) 500 which is a first electronic appliance, and a remote controller 600 for remote controlling the digital TV 500. The digital TV 500 includes a first displaying unit 81, and the remote controller 600 includes a second displaying unit 82.

The digital TV 500 has a substantially similar arrangement with the broadcasting receiving function of the mobile phone 100 shown in FIG. 3 above in the first embodiment of the invention. In other words, although not illustrated, the digital TV 500 includes an antenna for broadcasting, a demodulation unit, a decoder, etc., and is capable of displaying the video signal of the program content inside the received broadcast signal in the first displaying unit 81. That is, the first displaying unit 81 performs similar functions as with the first displaying unit 11 of the mobile phone 100 according to the first embodiment of the invention. Further, the digital TV 500 includes, for example, a communicating unit for connecting to a network, such as, for example, the Internet 300, a CPU, a RAM, a ROM, a flash memory, and a display controlling unit for controlling the first displaying unit 81 and second displaying unit 82 of the remote controller 600.

Furthermore, the digital TV 500 includes a communication means for communicating with the remote controller 600, in addition to the communicating unit for network connection. The communication means is, for example, an infra-red communication means such as those for HomeRF (Home Radio Frequency), and a radio communication functions such as those for a wireless LAN (Local Area Network), e.g., IEEE802.11 and Bluetooth (registered trademark). Of course, the communication means may be wire connected with the remote controller 600 by, for example, a LAN cable and a USB (Universal Serial Bus) cable.

As shown in FIG. 8(*a*), the second displaying unit 82 of the remote controller 600 displays the data broadcast content among the above described broadcast signal, and also functions as a touch panel, as is with the second displaying unit 12 of the mobile phone 100 according to the above described first embodiment of the invention. As in the case of the second displaying unit 12 of the mobile phone 100 according to the first embodiment of the invention, in the second displaying unit 82, channel adjusting buttons 13 and volume adjusting buttons 14 for adjusting channel and volume of the program content displayed in the first displaying unit 81 of the digital TV 500, an image capturing button 15 for capturing frame images of the program content, and a menu button 16 for displaying various menu screens of the digital TV 500, are displayed, and also, number keys 83 for performing, for example, channel adjusting are displayed as in the case of the above described channel adjusting buttons 13. The remote controller 600 has the above described wireless communicating function for communicating with the digital TV 500, and when there is a user operation to the buttons and keys in the second displaying unit 82, operation input signal that corresponds to the buttons and the keys are delivered to the CPU of the digital TV 500 using the wireless communicating function, and it becomes possible to remotely control the digital TV 500.

In the following, the operation of the digital TV 500 and the remote controller 600 arrange as described above will be described. FIG. 9 is a sequence diagram showing the operation. As in the case of FIG. 4 in the above described first embodiment of the invention, in FIG. 9, a case where the user directs the image capturing process and the image searching process with the remote controller 600 while the digital TV 500 is receiving the broadcasting will be described.

As shown in FIG. 9, first, when the digital TV 500 receives broadcast signal (step 91), the CPU of the digital TV 500 shows the program content in the first displaying unit 81 (step 92), and sends the displaying signal for the data broadcast content to the remote controller 600 (step 93) as shown in FIG. 8(*a*). When the remote controller 600 receives the displaying signal for the data broadcast content (step 94), the remote controller 600 displays the data broadcast content in the second displaying unit 82 (step 95).

Then, when the image capturing button 15 is pressed in the second displaying unit 82 of the remote controller 600 (Yes at step 96), the remote controller 600 sends the input signal of the image capturing button 15 to the digital TV 500 (step 97). The digital TV 500 which received the input signal captures the image (step 98), and sends the displaying signal for displaying the captured image to the remote controller 600 (step 99).

Then, as shown in FIG. 8(*b*), the digital TV 500 presents a split view by splitting the screen of the first displaying unit 81 into parts for the program content and the data broadcast content (step 100), and the remote controller 600 displays the captured image instead of the data broadcast content in the second displaying unit 82 (step 101).

Then, as in the case of the above described first embodiment of the invention, based on user operation in the second displaying unit 82 of the remote controller 600, the remote controller 600 sends the operation input signal to the digital TV 500, and the digital TV performs the process based on the operation input signal, and thereby, for example, the area designated image is extracted from the captured image, the image of the image search result which the digital TV 500 acquired from the search server is displayed in the second displaying unit 82 of the remote controller 600, and the search repetition is performed.

By means of the above described operation, in a case where the program content and the data broadcast content are watched using the digital TV 500 and the remote controller 600, it also becomes possible to display "other content" while continuing the display for both content. It is noted that, in the second embodiment of the invention, as with the first embodiment of the invention, it becomes possible to display the content with various forms, for example, according to the content of those content (e.g., whether a user operation is possible or not) and the user setting.

Further, as described for the first embodiment of the invention, the content which is displayed in the second displaying unit 82 of the remote controller 600 as "other content" in place of the data broadcast content in the present embodiment of the invention, is not limited to captured images, and various content can be displayed, such as an call incoming screen, web content, a mail receiving screen, a mail creation screen, and launching screens for various application software.

Furthermore, in order to understand the second embodiment of the invention more, other use case will be described. According to the use case, as an alternative arrangement for the digital TV 500 and the remote controller 600, a karaoke terminal that is, for example, in a karaoke parlor, and a remote controller for karaoke for operating the karaoke terminal are utilized, respectively. In a monitor of the remote controller for karaoke, usually, a song searching screen is displayed. Further, when a non-operating state of the remote controller for karaoke continues for certain period of time, the monitor display of the remote controller for karaoke transitions to, for example, menu screens for food and drinks, and newly-arrived song information screens, described, for example, in certain markup language. For example, by means of touching with a pen or a finger tapping on the menu screen, the user is able to order desired food and drinks. In addition, the menu screen includes, for example, search icons for returning to the search screen, or for presenting a split view by splitting the screen into parts for the menu screen and the song searching screen. In this use case, a karaoke playing screen (video and lyrics), a menu screen, and a song searching screen replace the program content, the data broadcast content, and the captured image, respectively.

As an example, we assume that a karaoke playing screen and a menu screen are displayed in the karaoke terminal side and the remote controller for karaoke side, respectively. In this case, for example, when an icon for search is selected, in the monitor of the remote controller for karaoke, either of:

(1) switching the display from the menu screen to the song search screen, or (2) presenting a split view for the menu screen and the song search screen, is performed. In the case of (2), it enables the user to search a song while selecting desired food and drinks looking at the menu screen. Further, in the case of (1), the karaoke playing screen and the menu screen may be displayed as a split view at the karaoke terminal side. In this case, for example, all the users in the karaoke box including the remote controller operator are able to enjoy video and lyrics of the playing karaoke song, and simultaneously, are able to select food and menu by looking in the menu screen. As for the remote controller operator, he/she is also able to search for a desired song.

The present invention shall not be limited to the above described embodiments of the invention, and of course, various modifications may be done without departing from the gist of the present invention.

In the above first embodiment of the invention, an example which uses the mobile phone 100 as the electronic appliance is described but other than the mobile phone, it may be applied to any kind of electronic appliances which have broadcasting receiving function and two displaying units, such as portable game machines, PDAs, and notebook PCs.

In the above described second embodiment of the invention, an example which uses the remote controller 600 as the second electronic appliance is shown but other electronic appliances, such as mobile phones and PDAs, may be used as a remote controller.

In the above described embodiments of the invention, the display for the data broadcast content is switched between the first and second displaying units but the display for "other content", such as -closed-captioned broadcast content, may be switched instead of the data broadcast content.

In the above described embodiments of the invention, processes of content for "one-seg" broadcasting is described, but of course, the present invention may be applied to the content processing in normal terrestrial digital broadcasting and BS/CS (Broadcast Satellite/Communication Satellite) digital broadcasting. Further, not only the content broadcasted from a broadcasting station via broadcasting wave, the present invention may be applied to content processing which is transmitted in, for example, a so-called IP (Internet Protocol) broadcasting over the Internet. Furthermore, in broadcasts that use either of the broadcasting wave or the Internet, the present invention may be applied to the process for playing back not only the content which the mobile phone 100 or the digital TV 500 receives but also the content which the mobile phone 100 or the digital TV 500 recorded (recorded video), for example, in the flash memory 27.

In the above described embodiments of the invention, examples which present a split view for the program content and the data broadcast content are shown, but various displaying forms are possible, such as, presenting a split view for both content in the first displaying unit as the first and second content in the initial state during the broadcast receiving, and displaying in the second displaying unit, the content such as closed-captioned broadcast content as the third content, and further, when there is a need to display fourth content, such as the above described captured images, presenting a split view by splitting the screen of the first displaying unit into three parts for the three of the first, the second and the third content and displaying the fourth content in the second displaying unit, or presenting a split view by splitting the screen of the first displaying unit into two parts for the first and the second content and presenting a split view by splitting the screen of the second displaying unit in two parts for the third and fourth content.

In the above described embodiments of the invention, examples in which the mobile phone 100 or the digital TV 500 makes the search server perform image searching process via the Internet based on the captured image are described, but the image searching process may be done from data stored in a storage device, such as flash memories and a HDD in the mobile phone 100 or the digital TV 500. Further, all of the content displayed in the displaying units may be acquired off-line.

Furthermore, for example, for an embodiment of the invention which applies a portable game machine as an alternative to the mobile phone 100, a game screen (e.g., cooking image), and recipe text (with operation buttons) may be displayed in the first displaying unit, and the second displaying unit, respectively. In addition, the portable game machine may be arranged to accept voice input. When other functions of the portable game machine are called by user operation, for example, the cooking image and the recipe text are displayed as a split view in the first displaying unit and the content corresponding to those functions are displayed in the second displaying unit. In this case, the user browses the called content while looking into the cooking image and the recipe, and is able to cook continuing the operation via the voice input.

In the above described embodiments of the invention, examples for determining whether to display the data broadcast content or not depends on whether there is a relationship between the program content and the data broadcast content, upon displaying "other content", such as the captured image, a web page, and a launching screen of various application software, are described, but other than the existence of the relationship, whether to display the data broadcast content or not may be determined depending on, for example, whether the data broadcast content displayed in the second displaying unit is a top page in the BML or a page which is deeper in hierarchy compared to the top page. In other words, in the case where the BML is structured so that the top page and other pages are in a tree shape, when a page which is deeper in hierarchy compared to the top page of the BML is displayed by the user in the second displaying unit, the phone displays, as a split view, the page with the program content in the first displaying unit and displays "other content" in the second displaying unit, and when the top page of the BML is displayed in the second displaying unit, the display for the top page is cleared and "other content" is displayed in place of the top page so that the display for the program content will be continued in the first displaying unit as it was. The reason for such a process is that, since the top page of the data broadcasting is tend to be not so important for the user, it is considered that there is no need to display, as a split view, the page with the first content, but when the page which is deeper in hierarchy compared to the top page is displayed, since it is considered that the user is intentionally browsing that page, in this case, that page is displayed, as a split view, with the first content and continued to be displayed even when "other content" is displayed.

Further, when "other content" is, for example, a menu box or a dialog box, the menu box, the dialog box, etc. may be superposed on either the first displaying unit or the second displaying unit.

Furthermore, in another embodiment of the invention, for example, the first displaying unit 11 is supported to the mobile phone body with a hinge structure having rotating two axes, and is capable of rotating 90 degrees against the body. This embodiment of the invention will be described referring to FIG. 5(*c*). It is noted that a well-known detecting means for detecting a direction of the first displaying unit 11 to the mobile phone body is provided in the mobile phone body.

When, for example, the first displaying unit 11 is placed in normal direction against the body (e.g., the state of FIG. 5(*c*)), a program, such as an OS, detects the direction of the first displaying unit 11, and makes the displaying form of the content the same as with FIG. 5(*c*). On the contrary, when the first displaying unit 11 is rotated 90 degrees from the normal direction and against the body, a program such as an OS, detects the direction of the first displaying unit 11, and displays the program content solely, for example, in the first displaying unit 11, and also, in the second displaying unit 12, displays the data broadcast content solely, or presents a split view by splitting the screen into parts for the data broadcast content and the image search result. In other words, in this embodiment of the invention, the displaying form of the content is changed according to the direction of the first displaying unit 11 to the mobile phone body. The setting for the displaying form is changeable, for example, by user operation.

Furthermore, the above described change of the displaying form is not limited to what is associated with the direction of the first displaying unit 11 to the mobile phone body. For example, when an acceleration sensor is built in the mobile phone, by means of the CPU 24 monitoring the sensor output, it is able to detect whether the mobile phone is in a longitudinal direction (when the longitudinal direction of the body is parallel to the horizontal direction) or in a lateral direction (when the longitudinal direction of the body is perpendicular to the horizontal direction). In this case, a program such as an OS may be able to change the displaying form of the content according to the detected result.

As described above, in accordance with the present invention, it becomes possible to display both of the television program broadcast content and the data broadcast content, and at the same time, display "other content".

What is claimed is:

1. An electronic device, comprising:
   a content acquiring unit configured to acquire a first content and a second content via a network or from inside of the electronic device;
   a first displaying unit configured to display the acquired first content;
   a second displaying unit arranged as a touch panel which is capable of accepting an input operation of a user, and capable of displaying the acquired second content;
   a display controlling unit which, based on a predetermined condition, if the content acquiring unit acquires a third content when the first and second contents are displayed in the first and second displaying unit, respectively, performs one of:
   (1) causing a split view by splitting a screen of the first display unit into parts for the first content and the second content, and causing a display of the third content in the second displaying unit; and
   (2) causing a split view by splitting a screen of the second displaying unit into parts for the second content and the third content, and causing a display of the third content in the second displaying unit,
   wherein the predetermined condition is that the third content includes selection information for an object selectable by user operation.

2. The electronic device according to claim 1, further comprising a selection information determining unit that determines whether the third content includes selection information for an object selectable by user operation, wherein:

when the third content is determined not to include the selection information, the display controlling unit is configured to cause a split view by splitting a screen of the first displaying unit into parts for the third content and the first content, and cause a display of the third content in the first displaying unit with the first content.

3. The electronic device according to claim 1, further comprising a displaying form designating unit for the user to designate a displaying form of the content, wherein the display controlling unit displays the content based on the user designation in the displaying form designating unit, when the content acquiring unit acquires the third content.

4. The electronic device according to claim 1, wherein the third content is content that includes associated information associated with the first content or the second content.

5. The electronic device according to claim 2, further comprising a recording unit configured to record as a captured image at least one frame of images of the first content displayed in the first displaying unit, wherein the second displaying unit is configured to display the recorded captured image as the third content according to the determination of the selection information determining unit.

6. The electronic device according to claim 5, further comprising:

a data for search creating unit configured to create data for search based on the captured image; and a communicating unit configured to transmit the created data for search via a certain network to a search server, and receive a search result corresponding to the data for search from the search server;

wherein the second displaying unit is configured to display the received search result as the third content according to the determination of the selection information determining unit.

7. The electronic device according to claim 6, further comprising an area designating operation input unit configured to designate a certain area of a targeted area image out of the displayed captured image, wherein the data for search creating unit is configured to create the data for search using the targeted area image extracted by the area designating operation input unit.

8. The electronic device according to claim 7, wherein the area designating operation input unit is configured to extract as the targeted area image an image included in an area which is encircled by a user's finger or a stylus in the second displaying unit in which the captured image is displayed.

9. The electronic device according to claim 7, wherein the area designating operation input unit displays a frame that has a size and is centered in a point contacted by the user's finger or the stylus in the second displaying unit in which the captured image was displayed.

10. The electronic device according to claim 6, wherein:

the communicating unit is further configured to transmit and receive a call signal of a telephone; and when there is an incoming call signal via the communicating unit or an outgoing call signal via the communicating unit, the display controlling unit causes a display in the second displaying unit of image data showing the incoming call or the outgoing call as the third content in place of the second content, and causes a split view by splitting a screen of the first displaying unit into parts for the first and the second content.

11. The electronic device according to claim 6, wherein:

the communicating unit is further configured to transmit and receive electronic mail data; and when an incoming electronic mail is received or an outgoing electronic mail is transmitted, the display controlling unit causes a display in the second displaying unit of image data showing the incoming electronic mail or the outgoing electronic mail as the third content in place of the second content, and causes a split view by splitting a screen of the first displaying unit into parts for the first and the second content.

12. The electronic device according to claim 11, wherein based on user operation to the second displaying unit, the display controlling unit is configured to cause a display in the second displaying unit of a creation screen for creating outgoing electronic mail data as the third content in place of the second content, and cause a split view by splitting a screen of the first displaying unit into parts for the first and the second content.

13. The electronic device according to claim 1, wherein:

the second content includes hyperlink information to an outside content; and when an operation to the hyperlink information is input in the second displaying unit by the user, the display controlling unit is configured to cause a display in the second displaying unit of the outside content corresponding to the hyperlink information as the third content in place of the second content, and cause a split view by splitting a screen of the first displaying unit into parts for the first and second contents.

14. The electronic device according to claim 1, wherein:

the second content includes starting command information for starting application software in the electronic device; and when an operation corresponding to the starting command information is input by the user in the second displaying unit, the display controlling unit displays in the second displaying unit of the starting screen corresponding to the starting command information as the third content in place of the second content, and causes a split view by splitting a screen of the first displaying unit into parts for the first and second contents.

15. The electronic device according to claim 1, wherein in order to display the third content, the display controlling unit determines whether a relationship exists between the first content displayed in the first displaying unit and the second content displayed in the second displaying unit, and when a relationship is determined to exist between the first content displayed in the first displaying unit and the second content displayed in the second displaying unit, the display controlling unit causes a display in the second displaying unit of the third content in place of the second content, and causes a split view by splitting a screen of the first displaying unit into parts for the first and second contents, and when a relationship is determined not to exist between the first content displayed in the first displaying unit and the second content displayed in the second displaying unit, the display controlling unit causes a display in the second displaying unit of the third content in place of the second content and preserves the display of the first content displayed in the first displaying unit.

16. The electronic device according to claim 15, wherein in order to display the third content in the second displaying unit, the display controlling unit causes a display in the first displaying unit or the second displaying unit of a screen for allowing the user to select whether to present a split view by splitting a screen of the first displaying unit into parts for the first and the second content, or to display, in the first displaying unit, the first content without displaying the second content.

17. The electronic device according to claim 1, wherein the first content is a television program broadcasting, which a broadcasting station broadcasts, and the second content is a data broadcasting, which is broadcasted together with the television program broadcasting.

18. The electronic device according to claim 1, further comprising a direction detecting unit configured to detect a direction of the first displaying unit relative to the body of the electronic device,
   wherein when the content acquiring unit acquires the third content, the display controlling unit causes a display of the content according to the detection result of the direction detecting unit.

19. A method for displaying a plurality of received content on a limited number of displaying units, the method comprising:
   acquiring a first content and a second content via a network or from inside of an electronic device;
   displaying the first content in a first displaying unit;
   displaying the second content in a second displaying screen arranged as a touch panel which is capable of accepting an input operation of a user;
   acquiring a third content; and
   controlling the first displaying unit and the second displaying unit by performing, based on a predetermined condition, one of:
   (1) causing a split view by splitting a screen of the first display unit into parts for the first content and the second content, and displaying in the second displaying unit the third content, and
   (2) causing a split view by splitting a screen of the second displaying unit into parts for the second content and the third content, and displaying in the second displaying unit the third content,
   wherein the predetermined condition is that the third content includes selection information for an object selectable by user operation.

20. The displaying method according to claim 19, further comprising:
   determining whether the third content includes selection information for an object selectable by user operation, wherein:
   when the third content is determined not to include the selection information causing a split view by splitting a screen of the first displaying unit into parts for the third content and the first content, and displaying the third content in the first displaying unit with the first content.

21. A non-transitory computer readable medium having computer readable instruction stored thereon, which, when executed by a processor of a computer, configures the processor to:
   acquire a first content and a second content via a network or from inside of an electronic device;
   cause a display of the first content in a first displaying unit;
   cause a display of the acquired second content in a second displaying screen arranged as a touch panel which is capable of accepting an input operation of a user;
   acquire a third content; and
   control the first displaying unit and the second displaying unit by performing one of:
   (1) causing a split view by splitting a screen of the first display unit into parts for the first content and the second content, and displaying in the second displaying unit the third content, and
   (2) causing a split view by splitting a screen of the second displaying unit into the second content and the third content, and displaying in the second displaying unit the third content,
   wherein the predetermined condition is that the third content includes selection information for an object selectable by user operation.

22. The computer readable medium according to claim 21, the instruction further configuring the processor to perform a selection information determining step of determining whether the third content includes selection information for an object selectable by user operation, wherein:
   when the third content is determined not to include the selection information causing a split view by splitting a screen of the first displaying unit into parts for the third content and the first content, and displaying the third content in the first displaying screen with the first content.

* * * * *